United States Patent
Michel et al.

(10) Patent No.: US 6,876,539 B2
(45) Date of Patent: Apr. 5, 2005

(54) METHOD FOR PRODUCING A COMPOSITE ELECTRODE FOR ELECTROCHEMICAL COMPONENTS, AND A COMPOSITE ELECTRODE

(75) Inventors: Hartmut Michel, Heidenheim (DE); Christoph Weber, Heidenheim (DE); Klaus Schoch, Heidenheim (DE)

(73) Assignee: Epcos AG, München (DE)

( * ) Notice: Subject to any disclaimer, the term of this patent is extended or adjusted under 35 U.S.C. 154(b) by 0 days.

(21) Appl. No.: 10/472,914

(22) PCT Filed: Jan. 17, 2002

(86) PCT No.: PCT/DE02/00131

§ 371 (c)(1),
(2), (4) Date: Feb. 2, 2004

(87) PCT Pub. No.: WO02/078025

PCT Pub. Date: Oct. 3, 2002

(65) Prior Publication Data

US 2004/0114304 A1 Jun. 17, 2004

(30) Foreign Application Priority Data

Mar. 23, 2001 (DE) .......................... 101 14 185

(51) Int. Cl.⁷ ........................... H01G 9/00; H01G 9/04
(52) U.S. Cl. .................... 361/502; 361/508; 29/25.03
(58) Field of Search .................. 361/502, 503, 361/511–512, 530–531; 29/25.03

(56) References Cited

U.S. PATENT DOCUMENTS

| 5,777,428 | A | 7/1998 | Farahmandi et al. |
| 6,187,061 | B1 * | 2/2001 | Amatucci et al. .......... 29/25.03 |
| 6,191,935 | B1 | 2/2001 | Okamura et al. |
| 6,198,621 | B1 * | 3/2001 | Saito et al. .................. 361/502 |

FOREIGN PATENT DOCUMENTS

| EP | 0 786 142 | 1/1998 |
| EP | 0 886 288 | 12/1998 |
| EP | 0 989 571 | 3/2000 |
| JP | 2-78213 | 3/1990 |

* cited by examiner

Primary Examiner—Eric Thomas
(74) Attorney, Agent, or Firm—Schiff Hardin LLP

(57) ABSTRACT

A method to produce a layer electrode for electrochemical components with a layer applied to a metal film to produce a connection between the metal film and the layer by softening the metal film and pressing a surface section of the layer over a part of the thickness of the layer into the softened metal film. The ohmic resistance of the layer electrode can be reduced in an advantageous manner via the pressing of surface sections of the layer into the metal film.

23 Claims, 3 Drawing Sheets

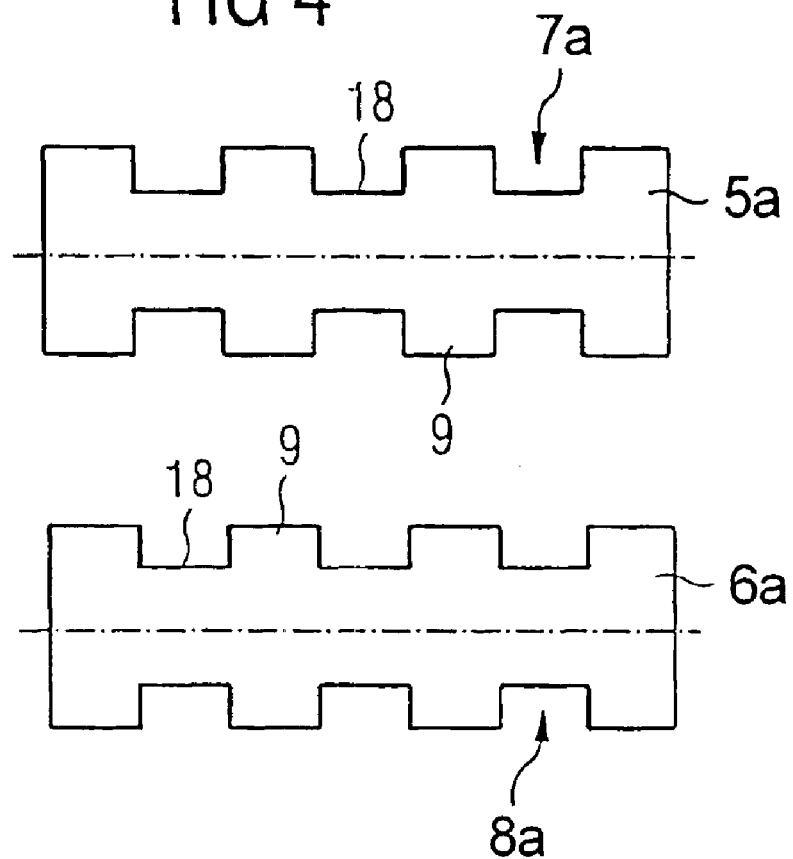
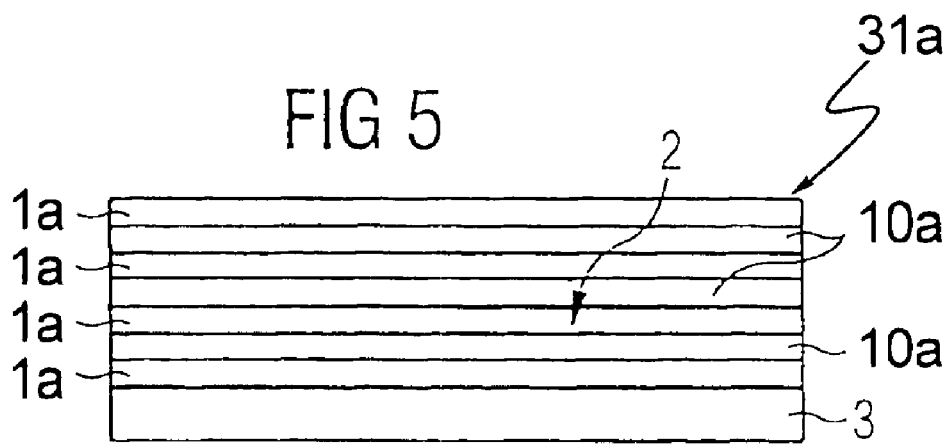

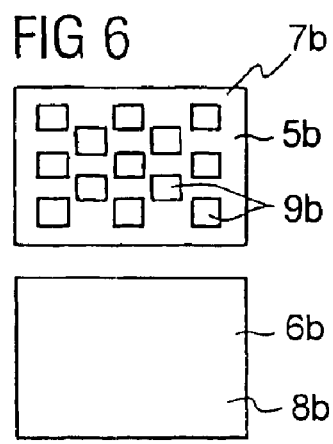
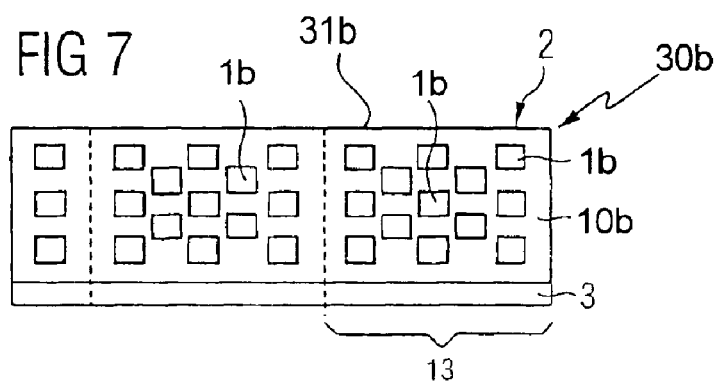
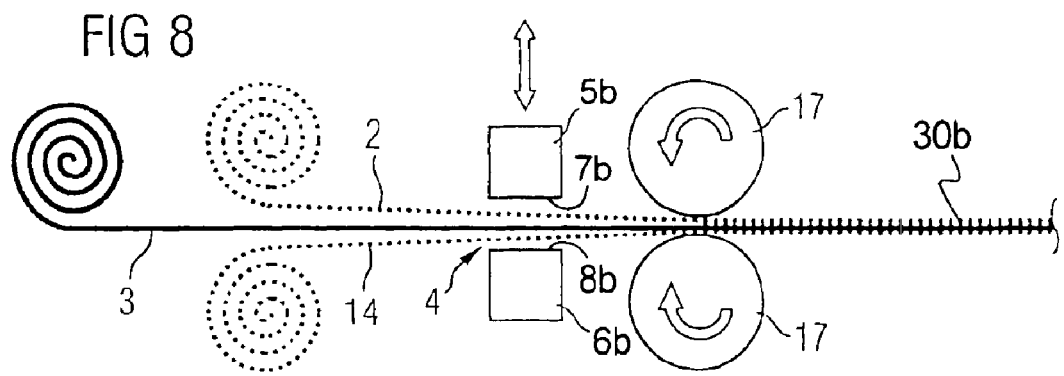

METHOD FOR PRODUCING A COMPOSITE ELECTRODE FOR ELECTROCHEMICAL COMPONENTS, AND A COMPOSITE ELECTRODE

BACKGROUND OF THE INVENTION

The invention concerns a method to produce a layer electrode for electrochemical components, whereby a layer is connected with a metal. Furthermore, the invention concerns a layer electrode for electrochemical components.

From the printed publication EP 0 786 142, electrochemical components are known in the form of electrochemical double-layer capacitors in which carbon layers are used as layer electrodes. In order to be able to contact the carbon of the carbon fabric with an aluminum electrode, the carbon fabric is first coated with a liquid or molten aluminum by means of an arc method. It is thereby achieved that the aluminum penetrates as deep as possible into the fibers of the carbon fabric, whereby a good electrical contact can be produced.

However, this method has the disadvantage that the hot aluminum easily oxidizes in the air and, due to the aluminum oxide layer thereby ensuing, the electrical contact resistance between the layer and the aluminum metal is increased.

Furthermore, the known method to produce a layer electrode has the disadvantage that the arc method requires a high mechanical stability of the layer in order to prevent a tear in the layer. In order to achieve the lowest ohmic resistance between the carbon material and the material discharging or, respectively, supplying current in an electrochemical double-layer capacitor, a large-surface direct contact must be generated between the carbon material and the metal.

A high mechanical stability of the layer means that the layer must be implemented with a relatively large thickness, whereby the area available for the contact with a metal electrode is reduced, which results in an increase of the ohmic resistance of the capacitor. Moreover, stable carbon layers require the use of expensive, stable fiber materials, which means increased raw material costs.

In the further course of the production, a coated layer is positioned on the top or, respectively, underside of an aluminum film. This aluminum film serves as a discharge electrode for the capacitor. This arrangement from a plurality of parts (film and layers) must be manipulated without shifting in the assembly of a capacitor winding, in order to prevent short circuits on the edge of the film as well as a damage of the carbon layers.

Furthermore, the known method has the disadvantage that it requires a plurality of individual work steps. The aluminum introduced into the layer via the arc method increases the layer thickness of the layer, whereby the volume utilization of the of the capacitor is worsened.

SUMMARY OF THE INVENTION

It is therefore the object of the present invention to specify a method to produce a layer electrode, whereby layers with lower mechanical stability can be manipulated, and the method is simple to implement.

The invention specifies a method to produce a layer electrode for electrochemical components with a layer applied to a metal film, whereby to produce a connection between the metal film and the layer a surface section of the layer is pressed into the metal film over a part of the thickness of the layer, and whereby the metal film is softened during the pressing.

The inventive method abandons the application of a molten or liquid aluminum to the layer in the arc method, whereby the mechanical stress for the layer is reduced. Layers with lower mechanical stability, and thus either layers with smaller layer thicknesses or layers produced from cheaper raw materials can thereby be used.

The use of thinner layers has the advantage that a total quantity of layer material (for example, carbon) to be placed in layers in the component can be distributed to a greater number of electrode layers, whereby the area available for the contacting of the layer with an electrode is increased. The ohmic resistance of the component to be realized thereby decreases, and therewith its losses, in an advantageous manner.

The danger of the oxidation of the metal is also reduced via the abandonment of the arc method, whereby the ohmic resistance of the layer electrode can be reduced.

Since sprayed-on aluminum is abandoned, the layer thickness of the layer electrode can be reduced, whereby the volume utilization increases in the component to be realized.

However, the layer thickness saved via the abandonment of the sprayed-on aluminum or, respectively, via the use of thinner layers can also be balanced by use of thicker aluminum films, whereby in the end effect the layer thickness of the layer electrode remains the same. However, the ohmic resistance of the layer electrode or, respectively, of the component to be realized is reduced, since thicker aluminum films enable a lower-ohmic connection to an external connection of the component.

Furthermore, the inventive method has the advantage that it comprises very few process steps, and thereby is cost-effective and simple to realize.

Moreover, the pressing of the layer into the softened metal film provides for an optimal electrical contact between layer and metal film.

In an advantageous embodiment of the invention, a layer comprising elementary carbon can be used as a layer, such as it is necessary, for example, for the realization of electrochemical double-layer capacitors.

Moreover, an aluminum film can be used as a metal film, as it is typical in the assembly of electrochemical double-layer capacitors.

The invention can be realized in that a layer stack with a layer lying over a metal film lies between a pressing tool and a stop, and whereby the layer stack is pressed by the pressing tool against the stop.

Moreover, a method is advantageous wherein a layer stack with a layer lying over a metal film lies between a pressing tool and a stop, and whereby the pressing tool presses the layer stack against the stop.

In an embodiment of the invention, the pressing tool can be provided with a flat surface that is pressed against the likewise flat surface of the stop. The pressed surface section of the layer can thereby be produced coherently, whereby the layer is pressed into the metal foil over its entire surface. In particular a deep connection of the metal foil with the layer, and correspondingly a lower ohmic resistance of the layer electrode, can thereby be effected. The flat surface can thereby be level or curved.

In the realization of an electrochemical double-layer capacitor, only the portion of the carbon layer that is not coated by metal contributes to the capacity. Correspondingly, it can be advantageous to press the layer into the metal film only in sections. The sections of the layer lying free on the metal film can thus contribute fully to the capacity of the component. Such a layer electrode can be produced in that a surface of the pressing tool, which has or exhibits recesses or depressions, is pressed against a stop whose surface is fashioned such that the layer is not pressed into the metal film at the locations of the depressions.

Furthermore, it is particularly advantageous when the metal film is softened in the proximity of the pressing tool or, respectively, the surface section to be pressed in or onto the metal film. It can thereby be achieved that the thermal stress and also the mechanical stress of the aluminum film is kept as small as possible, which enables the use of thinner aluminum films. The volume utilization of a capacitor can thereby be improved.

The softening of the metal film can, for example, be achieved via a heated pressing tool and/or stop.

A further possibility to soften the metal film is to run an electrical current through the film, perpendicular to the film. Such an electrical current could, for example, be caused via application of corresponding electrical potentials at the pressing tool and stop. In this case, pressing tool and stop must be electrically conductive.

Furthermore, it is also possible to effect the softening of the foil via emission of ultrasound. For this purpose, it is advantageous to use a pressing tool or, respectively, a stop that can emit ultrasound.

In order to achieve a still deeper connection of the layer with a metal, a metal powder can be applied to the surface section of the layer to be pressed in the metal film before the pressing of the layer into the metal film. Due to its smaller structural size, the metal powder can easily permeate into the layer, and thus a good electrical contact is produce between the metal film and the layer.

Furthermore, it is advantageous when a metal film is covered on both sides with two congruent layers, and these layers are connected with the metal film with the inventive method.

A metal film can be effective as a discharge electrode for two layers, whereby the layer thickness of the layer electrode is optimally used.

In a further advantageous embodiment of the invention, a cylindrical roller rotating around a cylinder axis can be used as a pressing tool that rolls on the layer stack, with which surface sections of the layer are continuously pressed into the metal film.

In a further exemplary embodiment of the invention, the layer stack exhibits the shape of a ribbon, a stamp that can be moved transverse to the layer is used as a pressing tool. The following steps are implemented:
 a) pressing of the stamp and the intermediate length section of the ribbon against a stop;
 b) movement of the stamp to release the ribbon; and
 c) movement of the ribbon in the lengthwise direction by means of a ribbon transport device.

Thus, a discontinuous method is available that in particular is suitable for the production of layer electrodes in sections.

In order to largely prevent an oxidation of the metal film, an advantageous embodiment of the invention has the production of the connection between the layer and the metal film occur in a reduced oxygen partial pressure or reducing atmosphere with regard to the surrounding atmosphere. A further decrease of the oxidation can be achieved in that the inventive method is implemented in an inert gas atmosphere or in a vacuum.

The method to produce a layer electrode can in particular be conducted with metal films of a thickness between 30 and 150 $\mu$m. Such metal films enable the production of small connection bands that exhibit a high current-carrying capacity.

Furthermore, in the inventive method, a layer is preferably used that exhibits a thickness between 100 and 500 $\mu$m. Such layers are relatively thin, such that the number of the layer electrodes per volume, for example in a capacitor, can be increased, so that the area available for contacting the layers increases. The ohmic resistance of the component to be produced decreases in an advantageous manner.

Typically, the layer suitable for electrochemical components contains carbon. It can be implemented as carbon paper, non-woven carbon fabric, carbon fabric, or also as a carbon felt.

Moreover, a plurality of fibers are also suitable for the layer that all run parallel in a preferred direction at least in sections and are connected with one another via bonding.

Such a layer has the advantage that, due to the fibers running parallel to one another in a single preferred direction, the interweave of fibers or threads (such as for example is in the case in fabrics) can be abandoned. Thus the layer can be produced cost-effectively. Moreover, since the fibers are connected with one another via bonding, the superimposition and interweaving of fibers with one another to produce the cohesion of the elements of the layer is no longer necessary, and it is possible to realize substantially smaller layer thicknesses for the layer, for example layer thicknesses between 10 and 500 $\mu$m.

In particular, the fibers can be activated carbon fibers that are present as lines (also known in English as "tow").

The bonding of the fibers among one another can, for example, be generated in that a line of fibers is pierced by needles with barbs transverse to the fiber direction. After removing such needles, some fiber sections run variant to the preferred direction and are interlocked with one another. The mechanical cohesion within the layer is thereby produced. However, the proportion of the fibers comprising fiber sections, which are variant to the preferred direction, is maximally 20%, so that the fiber line clearly differentiates itself from a non-woven material where the individual fibers exhibit no preferred direction at all.

In a further exemplary embodiment of the layer, a number of fibers can be stranded with one another and thus form a thread. This exemplary embodiment of the layer has the advantage that the mechanical cohesion transverse to the preferred direction is improved in comparison to the non-stranded fibers.

Furthermore, the cited embodiment of the layer has the advantage that it enables an increased material density in comparison to fibers interwoven with one another, whereby electrochemical double-layer capacitors produced with the layer exhibit an increased capacity.

In fibers stranded with one another into a thread, the bonding of the threads, and therefore the fibers forming the threads, can also be realized among themselves via fiber sections running variant to the preferred direction that are interlocked with one another.

A further possibility to produce the mechanical cohesion of the fibers is to sew up the fibers with one another transverse to the fiber direction by means of a sewing thread. Synthetics, that are converted into carbon fibers via pyrolysis (also known as carbonization) as well as subsequent activation of the surface, are preferably used as the fibers. The sewing up of the fibers with a sewing thread can either occur before the pyrolysis and the activation of the synthetic raw material or, however, right after the activation. As materials for the sewing thread, all materials are suitable that do not degrade the electrical properties of the electrochemical component. For the case that the electrochemical component is an electrochemical double-layer capacitor, for example polypropylene, polyethylene, or also Teflon are to be considered as sewing threads.

In order to not unnecessarily increase the layer thickness of the layer, sewing threads with a thickness between 10 μm and 50 μm are preferably used. The sewing threads can comprise an individual fiber or also a thread.

In a further embodiment of the invention, the cohesion of the fibers within the layer electrode can also be imparted in that a material acting as the bonding between the fibers is applied in places on the surface of the layer. The material imparting the bonding between the fibers can likewise be introduced in places into the layer.

All materials are suitable for this that do not degrade the electrical properties of the electrochemical component. In the case of an electrochemical double-layer capacitor, in particular materials are suitable that are inert with regard to the electrolytes uses in electrochemical double-layer capacitors. To stabilize the layer, carbon as a material placed or, respectively, deposited in the layer or on the surface of the layer by means of chemical vapor deposition is, for example, considered. However, by means of chemical vapor deposition, additional materials, in particular metals such as, for example, aluminum or copper, can also be deposited on or in the layer.

Furthermore, the cohesion of the fibers in the layer is generated or, respectively, produced via polymer additives. Possible polymer additives are, for example, polyethylene, polypropylene, polyvinylfluoride, and tetrafluoropolyethylene. The polymer additives are preferably supplemented with a weight proportion between 2 and 20% dependent on the carbon content of the layer.

As a raw material for the fibers, synthetics that comprise $C_6$ rings can be used with particular advantage. These synthetics can be pyrolized via heating under exclusion of air or, respectively, in an atmosphere with low oxygen content, so that they are almost completely convert to carbon. This event is also known as carbonization. Subsequent to the carbonization of the fibers, the surface of the fibers can be activated via etching processes. The etching can ensue via gas treatment, for example by means of $CO_2$ or $H_2O$, as well as chemically or electrochemically. By activating the fibers, the surfaces of the fibers are greatly increased. For example, a specific surface of 3000 $m^2/g$ can be generated from a specific surface of 100 $m^2/g$.

For example, phenol aldehyde fibers, cellulose fibers, pitch, polyvinyl alcohol and its derivatives, or also polyacrylnitrile can be used.

Furthermore, it is advantageous to use fibers with a thickness between 5 and 50 μm, since production of thin layers with a thickness between 5 and 500 μm is easier with such fibers. Given the use of very thin fibers, a plurality of fibers can also be used on top of one another in order to form the layer, if necessary. Given the use of a plurality of fibers one atop the other, the layer resulting from this has the advantage of an increased mechanical stability. However, in contrast to this it is also possible that the layer comprises a single fiber layer. The thinnest layer possible given the fiber strength can thereby then be produced.

Moreover, the invention specifies a layer electrode for an electrochemical component in which a surface section of a layer that lies on a metal film is pressed into a metal film. Such a layer electrode has the advantages already cited in the specification of the inventive method. In particular, it has the advantage that it can be effected thinner than conventional layer electrodes and that, due to the abandonment of the deposition of aluminum by means of an arc method, the oxidation of the aluminum, and therewith also the ohmic resistance of the layer electrode, can be reduced in an advantageous manner.

The layer applied to the metal film can be pressed into the metal film over its entire surface. However, it can also be that only surface sections of the layer that are separated from one another via surface sections lying free on the metal film are pressed into the metal film.

In the following, the invention is more closely explained using exemplary embodiments and the figures appertaining thereto.

BRIEF DESCRIPTION OF THE DRAWINGS

FIG. 4 is a schematic cross-sectional view of an embodiment of a pressing tool lying over a stop in accordance with the invention;

FIG. 5 is a plan view of a layer electrode produced with a pressing tool according to FIG. 4;

FIG. 6 is plan view of working surfaces of an embodiment of a pressing tool and a stop belonging thereto according to the invention;

FIG. 7 is a plan view a layer electrode produced with pressing tool according to FIG. 6; and FIG. 8 is a schematic cross-sectional view of an arrangement to implement an embodiment of the inventive method.

DESCRIPTIONS OF THE PREFERRED EMBODIMENTS

Figure 1:
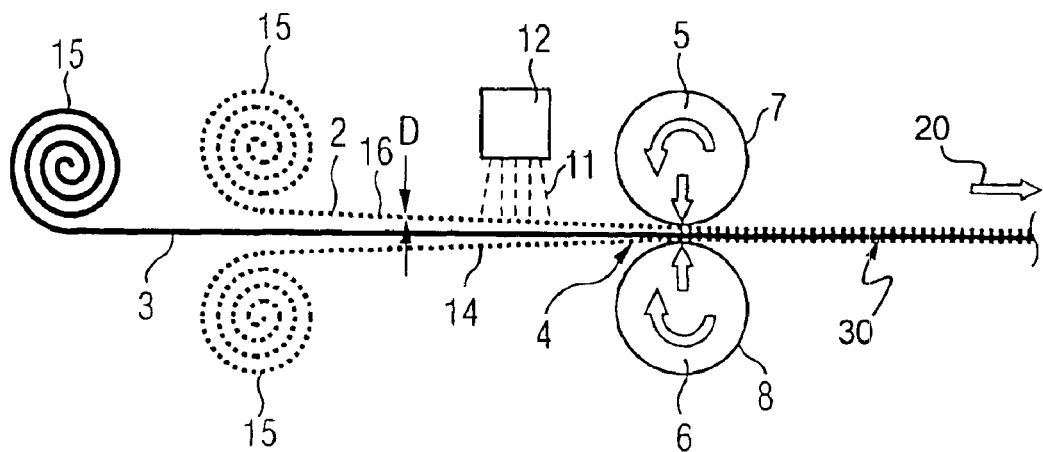
FIG. 1 is a schematic cross-sectional view of an arrangement to implement the inventive method.

FIG. 1 shows an arrangement to implement the inventive method. It comprises a pressing tool 5 that is implemented in the form of a cylindrical roller. The pressing tool 5 is arranged opposite a stop 6 that is likewise implemented in the form of a cylindrical roller. The pressing tool 5 and the stop 6 rotate around the respective cylinder axis with opposite rotation directions.

Between the pressing tool 5 and the stop 6, a ribbon runs that is comprised of three partial ribbons on top of one another, forming a layer stack 4. A layer 2 or, respectively, a second or further layer 14 is thereby arranged on both sides of a metal film 3 (that in the example shown in FIG. 1 is an aluminum film with a thickness of 100 μm). The layers 2, 14, as well as the metal film 3, exhibit the form of ribbons that are unwound from rolls 15.

The ribbons present in the shape of a layer stack 4 are transported in a lengthwise direction, which is indicated by arrow 20 via the synchronously running cylindrical rollers 5 and 6 that press against one another. At the narrowest point between the rollers 5 and 6, a high pressure is applied to the layers 2, 14, so that the layers 2, 14 are pressed into the metal film 3 to form a layered ribbon 30.

However, for this to happen, it is necessary for the metal film 3 to be softened. This ensues in the arrangement shown in FIG. 1, in that the pressing tool 5 and the stop 6 are heated to a temperature between 660° C. and 750° C. The heat comprised in the pressing tool 5 or, respectively, stop 6 can be conducted into the metal film 3 at the narrowest point between pressing tool 5 and stop 6 without a large waste. Since the metal film 3 is an aluminum film, it has a melting point of approximately 660° C. A slight transgression of this melting temperature by both rollers that press against the aluminum film is noncritical, since an aluminum oxide present in any case on the aluminum film substantially holds the shape of the film together. The aluminum film can also, if necessary, already be preheated to approximately 600° C. at the unwinding at the roll 15 so that the film can be very quickly heated to its melting point in the pressing zone. Both rollers press with a mechanical pressure against one another, which is sufficient to press the layer 2, 14 over a portion of its thickness D into the softened aluminum film. The metal film 3 can also be heated so that it liquefies in places.

Figure 2:
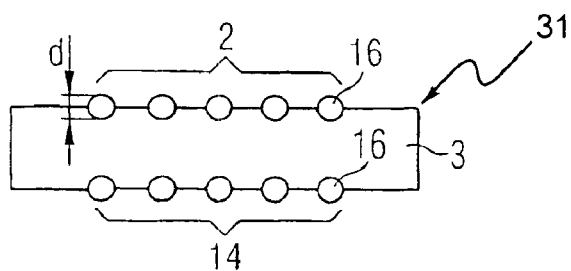
FIG. 2 is a schematic cross-sectional view of a layer electrode made by the method of the invention.

In the further course of the layer stack 4, after passing both rollers 5 and 6, which are pressing against one another, a layer electrode 31 is present that presents itself as metal film 3 layered on both sides with a layer 2, 14 (compare also FIG. 2).

Furthermore, the layer 2, 14 can comprise a carbon material that is present in the form of fibers 16 interwoven with one another into a fabric. Other embodiments of the carbon material are carbon paper or, respectively, carbon non-woven material, in which the fiber direction in the order of millimeters is arranged substantially parallel to one another and perpendicular to the material plane; however, that exhibits no preferred direction within the material plane. The layer 2, 14 can, however, also be a line made of fibers running in parallel in a preferred direction, whereby the preferred direction coincides with the lengthwise direction of the ribbons.

The layer 2 or, respectively, 14 shown in FIG. 1 is a carbon fabric that comprises a plurality of fibers 16 interwoven with one another.

In order to strengthen the layers 2, 14 with metal, aluminum powder can, for example, be applied to the top of the upper layer 2 before pressing the layers 2, 14 into the metal film 3. The metal powder 11 can be applied by means of a dispersal device 12. The dispersal device 12 can, for example, be implemented according to the type of a pepper shaker.

However, the metal powder 11 can similarly be transported in the pressing zone onto the metal film 3 or even onto the pressing tool 5. The metal powder comprises particles with an average size of 5 μm to 2 mm.

Both rollers used as pressing tool 5 and stop 6 comprise an admittedly curved but smooth surface 7, 8 of a constant diameter. It can thereby be achieved that, given corresponding widths of the rollers, the layer 2 or, respectively, the layer 14 are pressed into the metal film 3 over respectively their entire surface. An optimal electrical contact is thereby achieved between the metal film 3 and the layer 2 or, respectively, 14.

The metal film 3 coated with the layers 2, 14 can be separated transverse to the lengthwise direction of the ribbon into individual sections that subsequently, are stacked on top of one another, to form capacitor winding of a capacitor. The layers 2, 14 can exhibit a width of, for example, approximately 15 cm, while the metal film 3 exhibits a width of, for example, approximately 22 cm. An excess length or width that occurs for the metal film 3 can be guided or used in the form of a small connection band to an external connection of the capacitor.

In addition to the heating of the pressing tool 5 or, respectively, of the stop 6, the softening or, respectively, melting of the metal film 3 can also be caused via an electrical current. The electrical current can either flow between the pressing tool 5 and stop 6 or, however, also between the metal film 3 and the pressing tool 5 or between the metal film 3 and the stop 6. It is thereby substantially irrelevant whether the electric current flows to the left between the uncoated metal film 3 from both rollers or whether the electric current flows to the right through the coated metal film 3 from both rollers. In all cases, the highest electrical resistance of the current path at the contact point lies either between the pressing tool 5 and the stop 6 or between the aluminum film 3 and the pressing tool 5 or, respectively, the stop 6, such that heat caused by the current is substantially generated there. Via the control of the current or, respectively, the applied voltage, the heat generated in the heating zone between the pressing tool 5 and the stop 6 can be precisely controlled.

A further possibility to soften or, respectively, melt the metal film 3 is to use ultrasound rollers as the pressing tool 5 or, respectively, the stop 6. Very generally, in another manner ultrasonic power is radiated into the pressing zone between the pressing tool 5 and the stop 6, whereby the metal film 3 softens or, respectively, melts.

The cited methods to soften the metal film 3 can be used in all possible embodiments of the pressing tool 5 and the stop 6.

FIG. 2 shows a metal film 3 layered with a layer 2 and a layer, 14, as a product or electrode 31 made by a method implemented according to FIG. 1. One recognizes that the fibers 16 of the layers 2, 14 are not pressed into the metal film 3 over their entire thickness d. They are merely embedded over a portion of their thickness d into the metal film 3. It is thereby ensured that a sufficient surface of the layers 2, 14 remains that must interact with an electrolyte, for example in an electrochemical double-layer capacitor, to form its capacity. Such an interaction would not be possible when the layers 2, 14 or, respectively, their fibers 16 were pressed into the metal film 3 over the entire thickness d of the layer 2 or 14.

One recognizes in addition that a large-surface direct contact is produced within the metal film 3 to the material of the layer 2 or, respectively, 14, thus for example the fiber 16.

Figure 3:
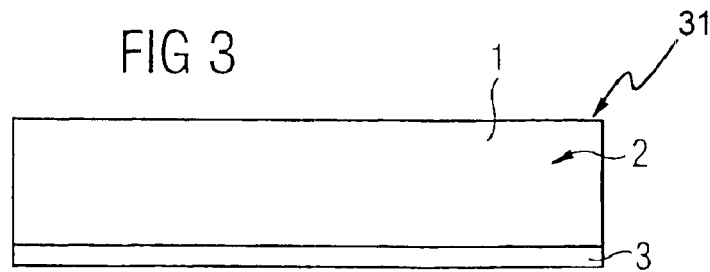
FIG. 3 is a plan view of a layer electrode made by the method of the invention.

FIG. 3 shows in a plan view the electrode 31 which has the metal film 3 coated with a layer 2 as it is produced by the method shown in FIG. 1. The metal film 3 has a somewhat larger width than the layer 2, so that an excess length is realized that can be used as small connection bands for contacting the metal film 3 with an external connection of an electrical component. Furthermore, as seen from FIG. 3, the layer 2 is pressed into the metal film 3 over its entire surface area, which means that much of the surface section or area 1 corresponds to the entire surface area of the layer 2.

FIG. 4 shows in cross section a pressing tool 5a and a stop 6a as it can be used in an arrangement according to FIG. 1. In contrast to the portrayal in FIG. 1, the surface 7a of the pressing tool 5a and the surface 8a of the stop 6a are not smooth with a constant diameter, but rather are provided with elevations 9 or, respectively, depressions 18. These elevations 9 have the shape of annular protrusions rotating in the circumferential direction around the cylindrical rollers. The elevations 9 and the arrangement of pressing tool 5a and stop 6a are thereby selected so that a elevation 9 of the pressing tool 5a impacts the a elevation 9 of the stop 6a. Thus the elevations 9 of the pressing tool 5a lie congruent over the elevations 9 of the stop 6a. The same is true for the depressions 18. Via a use of pressing tool 5a or, respectively, stop 6a according to FIG. 4, it can be achieved that the surface sections 1a of the layers 2, 14 (that are pressed into the metal film 3) are separated from one another by surface sections 10a of the layers 2, 14 that lie free on the metal film 3 (see FIG. 5).

FIG. 5 is a plan view of an electrode 31a which has a coated metal film 3 produced with an arrangement according to FIG. 1 using pressing tool 5a and stop 6a according to FIG. 4. The dimensions depicted in FIG. 5 corresponds to the dimensions of the shown in FIG. 3. In contrast to FIG. 3, the surface sections 1a (in which the layer 2 is pressed into the metal film 3) now run along lengthwise paths and are separated from one another by further lengthwise paths that represent sections 10a of the layer 2 that lie free on the metal film 3. Via such an arrangement, it can be achieved that the surface of the layer 2 active for the function in the electrochemical component is further enlarged, since the layer 2 is partially not embedded in the metal film 3 at all in the sections 10a.

FIG. 6 shows another embodiment of a pressing tool 5b or, respectively, a stop 6b as it can be used in an arrangement to implement the inventive method according to FIG. 8. The surface 7b, 8b of the pressing tool 5b or, respectively, of the stop 6b respectively facing the layer 2 or, respectively, 14 is thereby shown. The pressing tool 5b is characterized by a flat surface 7b, that has elevations 9b in the shape of small cubes. The counterpart to pressing tool 5b, namely the stop 6b, has on the other hand a smooth, flat, even surface 8b. Given a layer stack 4 lying between the pressing tool 5b and the stop 6b according to FIG. 8 and pressing of the pressing tool 5b against the stop 6b, a ribbon 30b of a layered metal film 3 according to FIG. 7 results, where the layered metal film 3 is shown in plan view.

The arrangement of the protrusion 9b of the pressing tool 5b is designed so that at a portion of all the fibers 16 are contacted with the metal film 3. In particular for the one-dimensionally structured fiber lines, it is important to allow no non-contacted fibers 16 along the lengthwise direction of the electrode.

FIG. 7 shows the ribbon 30b with a coated metal film 3 with dimensions that correspond to the dimensions shown in either FIG. 5 or, respectively, FIG. 3. In the implementation of the method according to FIG. 8, the layer 2 is connected with the metal film 3 in lengthwise sections 13, which are the same size as the electrode 31b. However, the pressing of the layer 2 into the metal film 3 ensues only at such locations at which the elevations 9b of the pressing tool 5b are located. At these locations are located surface sections 1b at which the layer 2 is pressed into the metal film 3. At all remaining surfaces, sections 10b of the layer 2 are or lie free on the metal film 3. The metal film 3 shown in FIG. 7 has the same advantages as the metal film 3 shown in FIG. 5; however, the surface portion of the pressed-in section of the layer 2 is still further reduced, so that the active material portion of the layer 2 available for the function of the component, for example for a capacitor, is still further increased. For example, via a coated metal film 3 according to FIG. 7, an electrochemical double capacitor can be realized with increased capacity with regard to a capacitor with a coated metal film 3 according to FIG. 5.

FIG. 8 shows a another arrangement to implement the inventive method that is similar to that shown in FIG. 1. In contrast to FIG. 1, a stamp that can be moved transverse to the ribbon direction along an otherwise stationary path is used as a pressing tool 5b, and a stationary block is used as a stop 6b. Since in this arrangement pressing tool 5b and stop 6b can no longer transport or convey a layer stack 4 made of a plurality of ribbons in the lengthwise direction, it is necessary to provide an additional ribbon transport device 17.

The method to produce a layer electrode according to FIG. 8 is implemented in that the ribbon transport device 17 intermittently transports the ribbons of layer 2, metal film 3, and layer 14 lying on top of one another over a lengthwise distance equal to section 13. The pressing tool 5b is subsequently pressed on the stop 6b, whereby depending on implementation of the surface 7b of the pressing tool 5b a more or less large surface section 1b of the layers 2, 14 is pressed into the metal film 3. The pressing tool 5b subsequently goes up, whereby the layer stack 4 is released for a further transport step over a lengthwise section 13 by means of the ribbon transport device 17. Through this, a discontinuous method is made available in that successive lengthwise sections 13 of the layers 2, 14 are pressed into the metal film 3. The ribbon transport device 17 can, for example, be realized by means of rollers pressed on the layer stack, as they were also already shown according to FIG. 1. In contrast to FIG. 1, the rollers must not necessarily be electrically conductive, as would be necessary to heat the metal film 3 by means of an electrical current.

In the coated metal films according to the FIGS. 3, 5, and 7, an uncoated edge of the metal film 5 remains that is not coated and that, in the further course of the production, serves for contacting the metal film 3 to external connections of the capacitor.

In addition to the aluminum films cited in FIG. 1, other metal films, for example copper films, can also be used.

In addition to the layers specified in FIG. 1 comprised of fibers lying in parallel, carbon paper, carbon non-woven material, or carbon felt are also considered as carbon fabric. In contrast to the fibers running in parallel in a preferred direction in a line, given the paper and given the non-woven material, a two-dimensional formation is obtained. While given felt carbon fibers which run in three dimensions, a formation in all three spatial directions is obtained.

The specified invention is not limited to electrochemical double-layer capacitors, but rather can likewise be used for other electrochemical components such as batteries or asymmetrical capacitors in which the charge storage is realized by the pseudocapacity of one or both electrode layers. It is accordingly also not necessary that the used layers 2 or, respectively, 14 comprise activated carbon fiber material. The activation of the carbon material is merely advantageous for the use of the layer electrodes in electrochemical double-layer capacitors.

The invention is not limited to the presented exemplary embodiments, but rather is defined in its most general form by the patent claims.

We claim:

1. A method for producing a layer electrode having a metal film with a layer of material being connected with at least a section of the surface of the metal film, said method comprising the steps of:

providing a pressing unit;

forming a stack of a metal film with a surface facing a layer of the material having a thickness, said layer of material having constituents being connected with one another;

conveying the stack to the pressing unit;

softening a portion of the metal film to form a softened area in the metal film; and pressing a section of the layer of the material into the softened area to a portion of the thickness of the layer with the pressing unit, so that the section of the layer is connected to the surface of the metal film.

2. A method according to claim 1, wherein the material is elementary carbon.

3. A method according to claim 1, wherein the metal film is an aluminum film.

4. A method according to claim 1, wherein the pressing unit includes a pressing tool coacting with a stop, and the step of conveying passes the stack between the pressing tool and the stop.

5. A method according to claim 4, wherein the tool and the stop have smooth surfaces so that all of an area of the layer contacted by the pressing unit is connected to the metal film.

6. A method according to claim 4, wherein the step of softening occurs in the proximity of the pressing tool.

7. A method according to claim 6, wherein the step of softening is heating the metal film by means of one of a heated pressing tool and a heated stop.

8. A method according to claim 1, wherein the step of softening is by conducting electrical current flow through the metal film.

9. A method according to claim 1, wherein the step of softening the metal film is by directing an ultrasound on the film.

10. A method according to claim 1, which includes, before the step of pressing a section of the layer into the softened area, applying a metal powder to the surface section to be pressed.

11. A method according to claim 1, wherein the step of forming the stack includes providing a layer of material on both surfaces of the metal film, so that the layers of material are congruent to one another.

12. A method according to claim 1, wherein the pressing unit is a coacting pair of roller rotating around a cylindrical axis for rolling the stack.

13. A method according to claim 1, wherein the stack is a ribbon-shaped stack, wherein the pressing unit includes a stamp which moves transverse to the plane of the stack against a stop, and said step of pressing comprises pressing an intermediate length section of the ribbon-shaped stack between the stamp and stop, moving the stamp transverse to the stack to release the ribbon-shaped stack and then conveying the ribbon-shaped stack in a lengthwise direction by means of a ribbon transport device.

14. A method according to claim 1, which includes conducting the steps of softening and pressing in an atmosphere with a reduced oxygen partial pressure relative to the surrounding atmosphere.

15. A method according to claim 1, wherein the steps of softening and pressing occurs in an inert gas atmosphere.

16. A method according to claim 1, wherein the metal film has a thickness between 30 $\mu$m and 150 $\mu$m.

17. A method according to claim 1, wherein the layer of material has a thickness of between 100 $\mu$m and 500 $\mu$m.

18. A method according to claim 1, wherein the material of the layer is selected from a group consisting of carbon paper, carbon non-woven material and carbon felt.

19. A method according to claim 1, wherein the layer of material is composed of a plurality of fibers extending at least in sections in parallel in a preferred direction and the fibers are connected with one another via bonding.

20. A layer electrode for electrochemical components, said layer electrode comprising a metal film, a layer of material having a thickness and having constituents connected to one another, said layer of material having surface sections being pressed into the metal film to a portion of the thickness of the layer.

21. A layer electrode according to claim 20, wherein the entire surface of the layer of material is pressed into the metal film.

22. A layer electrode according to claim 20, wherein the surface sections of the layer pressed into the metal film are separated from one another by surface sections free of the metal film.

23. A method for producing a layer electrode having a metal film with a layer of material being connected with at least a section of the surface of the metal film, said method comprising the steps of:

providing a pressing unit including a pressing tool coacting with a stop, said tool having a surface with at least one depression;

forming a stack of a metal film with a surface facing a layer of the material having a thickness;

conveying the stack between the pressing tool and the stop of the pressing unit;

softening a portion of the metal film to form a softened area in the metal film;

pressing a section of the layer of the material into the softened area to a portion of the thickness of the layer with the pressing unit, so that the section of the layer is connected to the surface of metal film and the layer at the location of the depression is not pressed into the metal film.

* * * * *